United States Patent [19]
Kett et al.

[11] Patent Number: 6,092,922
[45] Date of Patent: Jul. 25, 2000

[54] FOOD BLENDER WITH A BALANCED BLADE

[75] Inventors: David J. Kett, St. Joseph; Barry Chaffin, deceased, late of Benton Harbor; by Donald L. Bleich, legal representative, St. Joseph, all of Mich.

[73] Assignee: Whirlpool Corporation, Benton Harbor, Mich.

[21] Appl. No.: 09/342,427

[22] Filed: Jun. 29, 1999

[51] Int. Cl.[7] .................................................. A47J 43/046
[52] U.S. Cl. ........................ 366/205; 366/314; 241/282.2
[58] Field of Search ............................... 366/96–98, 197, 366/205, 314; 241/282.1, 282.2; 99/348

[56] References Cited

U.S. PATENT DOCUMENTS

| | | |
|---|---|---|
| 2,585,255 | 2/1952 | Kochner et al. . |
| 2,757,909 | 8/1956 | Wayne . |
| 2,771,111 | 11/1956 | Seyfried .................................. 366/205 |
| 2,897,862 | 8/1959 | Malz et al. ............................... 366/205 |
| 3,139,917 | 7/1964 | Elmore .................................... 366/205 |
| 3,240,246 | 3/1966 | Dewenter . |
| 3,368,800 | 2/1968 | Barnard, Jr. . |
| 3,380,499 | 4/1968 | Vocci et al. . |
| 3,738,583 | 6/1973 | Berland et al. .......................... 366/205 |
| 4,087,053 | 5/1978 | Voglesonger .......................... 241/282.1 |
| 4,462,694 | 7/1984 | Ernster et al. .......................... 366/314 |
| 4,887,909 | 12/1989 | Bennett . |
| 5,302,021 | 4/1994 | Jennett et al. . |
| 5,487,511 | 1/1996 | Sansone et al. . |
| 5,526,949 | 6/1996 | Carey et al. . |
| 5,823,672 | 10/1998 | Barket . |

FOREIGN PATENT DOCUMENTS

| | | | |
|---|---|---|---|
| 1180101 | 10/1964 | Germany .............................. | 366/205 |
| 1339827 | 12/1973 | United Kingdom ................... | 366/205 |

*Primary Examiner*—Charles E. Cooley
*Attorney, Agent, or Firm*—Joel Van Winkle; Robert O. Rice

[57] ABSTRACT

A blade is provided for use in a blender wherein the blade is to rotate about a vertical axis of rotation. The blade is formed with a central hub portion defining a horizontal plane, and in a preferred arrangement, has four tines extending outwardly from said hub portion with each tine angularly spaced at 90° to two adjacent tines to form two opposed pairs of tines, however, with the tines being arranged asymmetrical to one another. In order to reduce vibration and torque occasioned by the asymmetrical arrangement of the tines, each tine in an opposed pair is formed to be balanced to the other tine with respect to a first product of its mass times a distance of its center of mass from the center of rotation and with respect to a further product of its mass times a distance of its center of mass from the axis of rotation and times a distance of its center of mass from the horizontal plane. Preferably the magnitude of the products for each tine in an opposed pair should be within 1% of the magnitude of the products for the other tine in the pair.

21 Claims, 2 Drawing Sheets

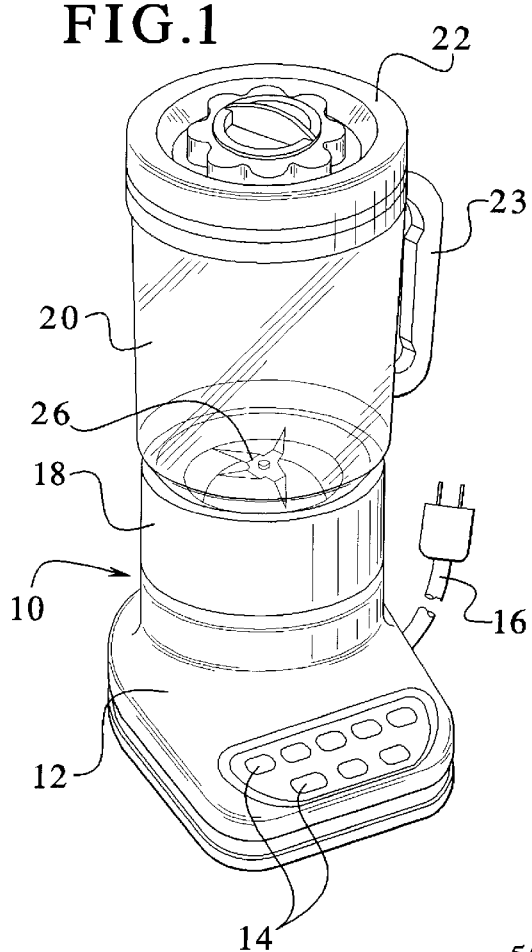
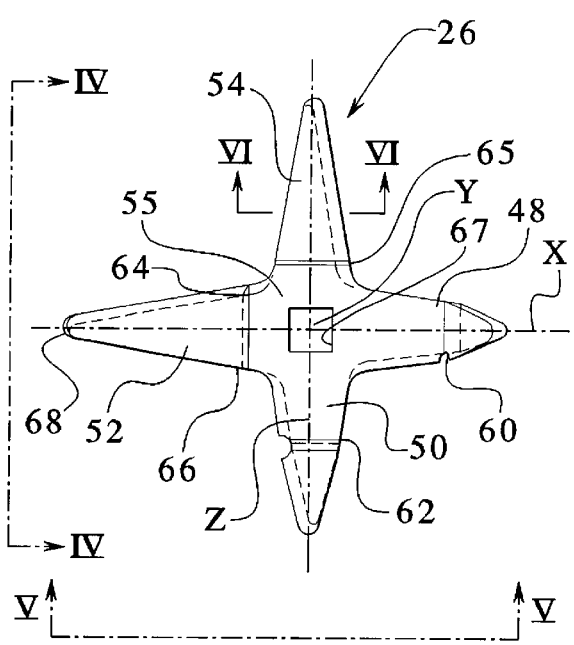
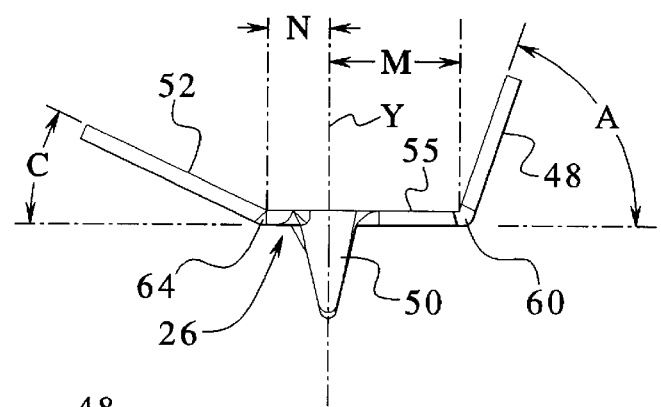
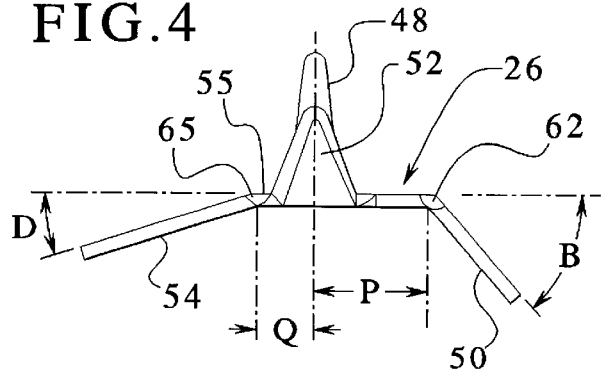
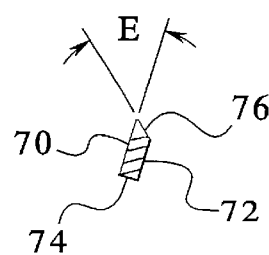

FOOD BLENDER WITH A BALANCED BLADE

BACKGROUND OF THE INVENTION

The present invention relates to a blade for use with a kitchen blender.

Kitchen type blenders generally have a fixed base containing a motor with a drive shaft extending vertically therefrom. A jar is secured onto the fixed base for holding solid and/or liquid food items to be blended, liquefied or chopped, etc. A blade assembly is mounted within the bottom portion of the jar for driving engagement with the motor shaft. In some cases the horizontal cross section of the jar is generally square with rounded corners and in other cases the horizontal cross section of the jar is circular.

Generally each blade assembly is provided with a plurality of tines, usually with at least two tines having a different angular orientation from horizontal. Oftentimes the tines are formed separately from each other and are held together when the blade assembly is formed.

Because kitchen type blenders are used for wide variety of functions including blending liquids, chopping food items, liquefying food items and chopping items such as ice, any one particular orientation of tines which may be optimum for a given function, may not be optimum for a different function. Configuration of the blender jar and adjoining base as well as the physical structure of the food item being acted upon by the blade tines all affect the optimum configuration for the blade tines.

SUMMARY OF THE INVENTION

The present invention provides a blade configuration which optimizes the tine configuration to accommodate a wide variety of functions to be performed by the blender. Preferably the blade is formed with four tines, each tine being angled from horizontal at a different angle to provide an asymmetric design, such that material in the blender will be struck at different locations by the tines of the blade. One of the tines may be angled upwardly from horizontal at an angle greater than 45° and one of the tines may be angled downwardly from horizontally at an angle greater than 45°. The four tines preferably are formed as an integral member so that they will remain perpendicular to one another when looking along an axis of rotation of the blade. Each of the tines has a wide base adjacent to a central shaft and a narrow tip which extends away from the shaft.

The adoption of an asymmetrical design for the blender blade can create problems with respect to vibration and bearing load. That is, with an asymmetrical design, wherein the blade is rotated at speeds of 10,000 RPM or greater, differences in the angular momentum and torque created by the different tines of the blade cause an increase in vibration as well as an increased load on the bearing for the shaft carrying the blade. This increased load creates an increase in friction and thus heat in the area of the motor, as well as causing an increased energy requirement for operating the motor. Further, the increased vibration detrimentally affects the life of the blade to the point where the blade could fail well before a normal life of the blender itself. Such a detriment has both marketing and safety considerations.

The present invention addresses and solves these problems by balancing opposed tines of the blade dynamically, that is, with respect to centrifugal forces acting on the blades, as well as with respect to torque values. In this way, both vibration and bearing load are minimized.

In a preferred embodiment, the blade has four tines being two opposed pairs of tines with each pair being positioned perpendicular to the other with respect to an axis of rotation of the blade. Again, in the preferred embodiment, one pair of opposed tines is bent upwardly and the other pair of opposed tines is bent downwardly. Each pair is designed to have the centrifugal forces and the torque values minimized, that is, reduced as close to 0 as possible, in order to achieve maximum balance. Specifically, to balance the centrifugal forces, a mass for each tine is determined as well as the distance of a center of mass for each tine from the axis of rotation. The mass of each tine is multiplied against the center of mass distance to the rotational axis to determine the force acting on each tine. The tines are to be designed so that the magnitude of the product for each pair is as close as practical to being the same as for the other of the pair in order to achieve the balance. Of course, since the tines extend in opposite directions from each other and from the axis of rotation, while the magnitude of the products are equated, the actual products are opposite one another in that one of the tines extends a negative (or opposite) distance from the axis of rotation. Hence, the sum of the products with respect to each tine pair approaches 0 as balance is achieved.

To balance torque, for each tine a further multiplication is made, that being the first product as just described times a distance that the center of mass for the tine is from a central vertical position on the blade, for example, a horizontal hub portion from which the tines extend.

Although there are many solutions to the overall balancing problem which result in many different blade designs, certain design features are preferred according to the principles of the present invention in order to maximize performance of the blade in chopping, stirring or grinding various types of foods. For example, it was determined to be desirable for one of the tines to extend upwardly a significant degree, which is particularly useful in chopping ice cubes which would tend to bounce around above the tines if a tine tip is low or is angled below a 45° angle. It was also determined that one of the downwardly extending tines should extend downwardly to sufficient degree in order to keep clear a lower area of the blender jar. Intermediate positions were selected for the other two tines.

BRIEF DESCRIPTION OF THE DRAWINGS

FIG. 1 is a perspective view of a food blender embodying the principles of the present invention.

FIG. 3 is a plan view of the blade for the blender.

FIG. 4 is a side view taken generally along the line IV—IV of FIG. 3.

FIG. 5 is a side view of the blade taken generally along the line V—V of FIG. 3.

FIG. 6 is a sectional view of a blade tine taken generally along the line VI—VI of FIG. 3.

DETAILED DESCRIPTION OF THE PREFERRED EMBODIMENTS

Figure 2:
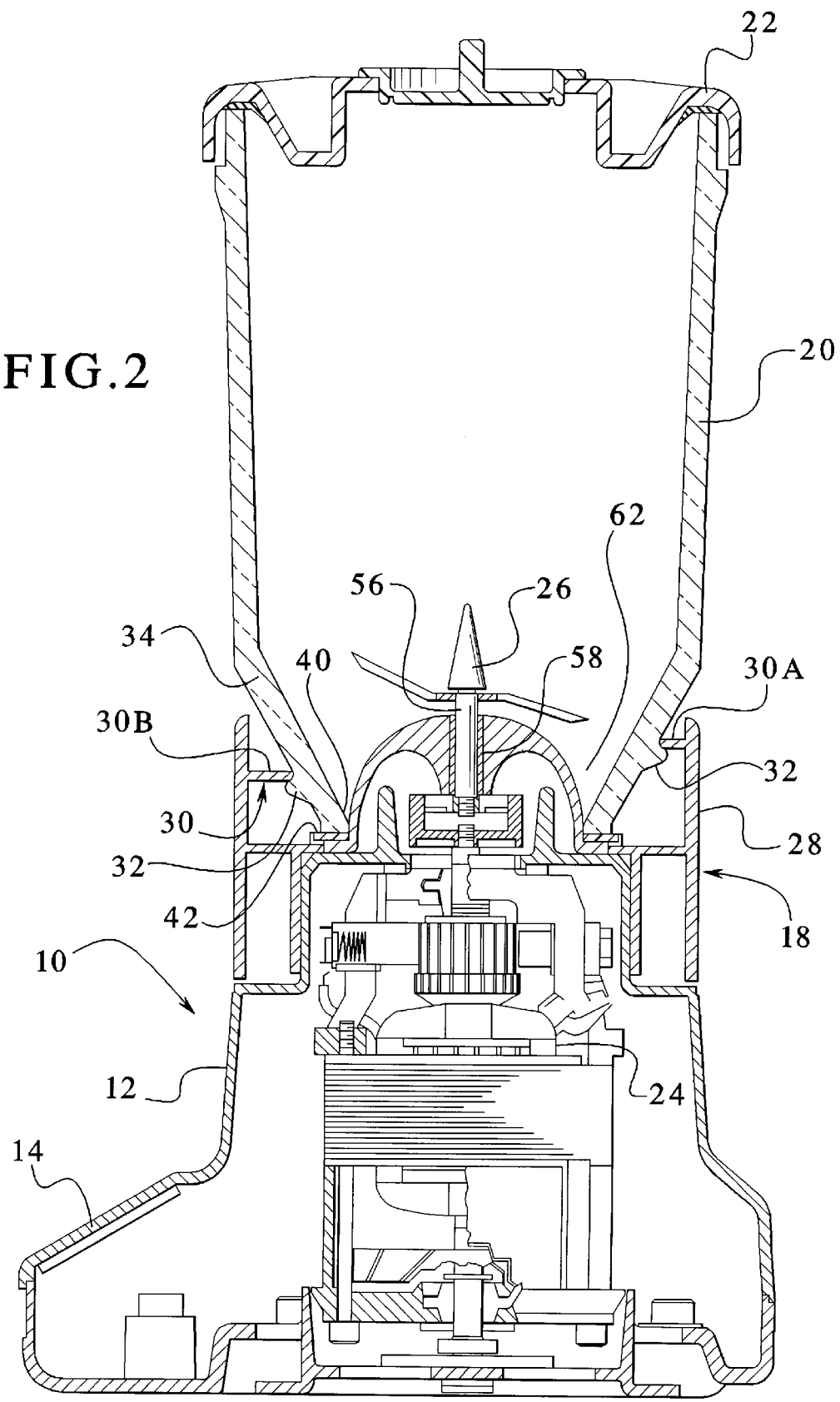
FIG. 2 is a side sectional view of the interior of the blender.

The present invention finds particular utility in a kitchen blender and different configurations embodying the principles of the present invention could be utilized in different blender constructions. A particular embodiment is disclosed herein with respect to a blender having a cylindrical jar of a certain size and a dome shaped floor for the blender jar.

Other shapes and sizes of jars and other configurations for the floor of the jar might result in other design considerations for the arrangement of the tines, however, in accordance with the principles of the invention, the tines should be balanced as described herein to reduce vibration and torsional load.

FIG. 1 illustrates a domestic kitchen blender generally at 10 which is comprised of a base member 12 having a plurality of electrical controls 14 and an electric cord 16 for connecting to a source of electrical power. The base 12 has an upstanding portion 18 to which is attached a jar 20. The jar 20 is provided with a lid 22 to close a top end of the jar. The jar 20 also has a radially projecting handle 23.

The internal components of the blender 10 are shown in greater detail in FIG. 2 where it is seen that the base 12 encloses an electric motor 24 which is used to rotatingly drive a blade 26 positioned within the blender jar 20. The upstanding portion 18 of the base 12 is a collar member which is separate from the base 12 and is slidingly received on the base. The base collar 18 has an essentially cylindrical outer wall 28 which is provided with an internal thread 30 to engage with an external thread 32 on the jar 20.

When the jar 20 is introduced into the base collar 18 and rotated with the respect thereto, the threads 30, 32 will engage and cause a bottom end 40 of the jar to sealingly engage against a seal 42. The seal 42 is supported by a circumferential flange 44 which is part of a floor 46 for the blender. In the embodiment illustrated in FIG. 2, the floor 46 is formed in a convex shape thus giving the floor an arcuate profile. As mentioned above, in other embodiments the floor could have a different profile such as flat, concave or conical.

The blade 26 of the preferred embodiment has four tines 48, 50, 52 and 54 which preferably are formed together as an integral piece and which piece has a hub portion 55 from which the tines extend and which is captured on a shaft 56. A blade could also be provided with a different number of tines and/or the blade may be provided wherein the tines are formed separately from one another and are joined prior to or during assembly onto the shaft 56. The shaft 56 is received in a bearing 58 which is carried vertically in the convex floor 46. The shaft 56 exits from an apex of the convex floor 46.

The tines are preferably arranged to extend horizontally from the hub portion 55 at a 90° angular spacing and are designed and arranged such that opposing tines 48 and 52 are in balance and opposing tines 50 and 54 are in balance. That is, a mass for each tine is determined as is a center of mass for each tine. The mass for each tine is multiplied against a distance of the center of mass of the tine relative to the axis of rotation and the magnitudes of this product for the tines of each opposing pair should be as nearly equal as practical in order to achieve a dynamic balance, which is a balancing of centrifugal forces in order to substantially reduce or eliminate vibration. A second balancing is performed which involves taking the first product for each tine, as just described, and further multiplying it by a distance of the center of mass for the tine vertically from a horizontal plane at the center of the hub 55. The magnitude of this further product for each tine should be as close to equal as practical to the magnitude of this further product for the opposite tine. In this way torque will be minimized. While the two pairs do not have to balance with each other, the two tines within each opposing pair must balance in order to achieve complete balance. Although the invention does not require absolute perfection, that is, the balance need not be precisely equal, the design magnitude of these products for each tine in the pair should be within (1%) of the other tine of the opposing pair.

Thus, for example, in referring to FIG. 3 it can be stated that tine 48 extends along an x-axis in a positive direction while tine 52 extends along the x-axis in a negative direction. A y-axis can represent the axis of rotation, as best seen in FIG. 5. Tine 50 can be said to extend in a positive direction along a z-axis while tine 54 extends in an opposite direction along the z-axis. Each blade is nearly, but not exactly symmetrical about the axis along which it extends due to a cutting edge formed on one side of each tine as described below. Thus, if the mass of tine 48 is represented by $M_{48}$, the distance of the center of mass for tine 48 along the x-axis is represented by $X_{48}$, and the distance of the center of mass for the tine 48 along the y-axis is represented by $Y_{48}$, and similar representations are made, then the sums of the forces on the first and second pairs of tines to be minimized are represented by the following formulas where SV1 represents the sum of the vibration forces on the first pair. SV2 represents the sum of the vibration forces on the second pair, ST1 represents the sum of the torque forces on the first pair and ST2 represents the sum of the torque forces on the second pair.

$$SV1 = (M_{48} * X_{48}) +$$
$$(M_{52} * X_{52})$$
$$SV2 = (M_{50} * Z_{50}) +$$
$$(M_{54} * Z_{54})$$
$$ST1 = (M_{48} * X_{48} * Y_{48}) +$$
$$(M_{52} * X_{52} * Y_{52})$$
$$ST2 = (M_{50} * Z_{50} * Y_{50}) +$$
$$(M_{54} * Z_{54} * Y_{54})$$

Each of these values should be reduced to be as close to zero as practical, and, at least, the products of each pair should be within (1%) of each other.

While many solutions to these equations are available merely to achieve balance between the blades, even in asymmetrical designs, other considerations are important in enhancing the performance of the blade as used in a blender. For example, it is beneficial to have one tine extend upwardly and at an angle greater than 45° in order to provide enhanced chopping action for items such as ice cubes. It is also valuable to have one tine extend downwardly toward the bottom or floor of the blender jar in order to chop or blend materials which collect in that region. In order to achieve the balance, several parameters with respect to the tines can be modified including the included angle of each tine from its tip to its base, a bend angle relative to horizontal and a bend location along the length of the tine. Although thickness of different tines or along the length of individual tines could be modified, in the preferred embodiment the thickness is maintained constant throughout the entire blade.

The configuration of the tines is shown in greater detail in FIGS. 3–6 where it is seen that the first tine 48 is bent upwardly at a point 60 such that it has an angle A greater than 45° above horizontal, and in a preferred embodiment around 70–74°.

The second tine 50 is bent downwardly at a point 61 such that it has an angle B greater than 45° below horizontal, and in a preferred embodiment around 48–52°. The second tine 50 extends down into an area 62 where the floor 46 meets the jar 20 at the lower end 40 of the jar.

The third tine 52, opposite tine 48, is elevated above horizontal at a bend 64. Preferably this blade is bent upwardly at an angle C less than 45° from horizontal and in a preferred embodiment is about 23–27°. In order to achieve the proper balance between tines 48 and 52, since tine 48 extends upwardly to a greater degree than tine 52, it is necessary for the bend point 60 to be at a distance M from the y-axis which is greater than a distance N for bend point 64 from the y-axis. Similarly, since tine 50 extends downwardly to a greater degree than 54, a distance P of the bend point 61 is greater than a distance Q from a bend point 65 of tine 54.

The fourth tine 54, opposite tine 50, is angled downwardly at the bend point 65 such that it has an angle D from horizontal, also less than 45°, and in the preferred embodiment it is about 16–20°.

Thus, in the preferred embodiment, each of the four tines are angled from horizontal at a different angle. The first and third tines, as described above, should be diametrically opposite one another while the second and fourth tines should also be diametrically opposite each other.

Each tine has a wide base 66 adjacent to a mounting hole 67 in the hub portion 55 for the shaft 56 and a narrow tip 68.

A cross section of a tine is shown in FIG. 6 where it is seen that the tines have a lateral cross sectional shape formed by four surfaces 70, 72, 74 and 76, a top 70 and bottom 72 surface being parallel, one side surface 74 being perpendicular to the top and bottom surfaces, and a second side surface 76 being formed at an acute angle E to one of the top and bottom surfaces. Preferably the acute angle E is approximately 45° and is formed between the top surface 70 and the side surface 76. Thus, a sharp cutting edge is provided for each of the tines.

The first tine 48 finds particular usefulness in assuring that ice cubes and other relatively hard objects, which are being chopped by the blender, do not merely bounce around above the more horizontally inclined tines, particularly when a lower portion of the blender jar 20 begins to fill with a chopped portion of the objects. The second tine 50 is useful in assuring that small items trapped in the lower area 62 of the jar 20 and below the level of the tines are affected by the tines and also get chopped as well. The remaining two tines 52, 54, being angled slightly differently, and more horizontally than the first and second tines, provide the chopping and blending action in an intermediate zone.

Thus, a blade with the tine configuration as disclosed is useful over a wide range of chopping and blending requirements and, due to the integral formation of the tines, manufacturing and assembly of the blade is improved and reliability of the blade is enhanced. Further, due to the balancing of the tines as described, vibration and torque associated with operation of the blender can be substantially reduced, thus enhancing the life of the blade, reducing the energy demand for operation of the blender, and reducing the temperature of the bearing 58 for the blade shaft 56.

In a testing of various blade configurations wherein a sample asymmetric blade, balanced in accordance with the principles of the present invention, was used in a blender running at 10,000 RPM for 3 minutes without any material in the blender, the bearing temperature rose to between 160° F. and 170° F. However, an asymmetrical blade with the tine tips in substantially the same locations as the balanced blade, but not balanced in accordance with the principles of the present invention, had the bearing temperature rise to over 250° in less than 2 minutes at 10,000 RPM.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of my contribution to the art.

The embodiments of the invention in which an exclusive property or privilege is claimed are defined as follows:

1. A blade for use in a blender wherein said blade is to rotate about a vertical axis of rotation, said blade comprising:
   a central hub portion defining a horizontal plane,
   a plurality of tines extending outwardly from said hub portion asymmetrically relative to one another,
   said tines being arranged in opposed pairs wherein each opposed pair includes a first tine and a second tine and each tine having a mass and a center of mass, the first tine and second tine in an opposed pair being balanced with respect to each other,
   wherein a first product consisting of the first tine's mass times a distance of the first tine's center of mass from said axis of rotation is substantially equal to a second product consisting of the second tine's mass times a distance of the second tine's center of mass from said axis of rotation
   further wherein a third product consisting of the first product times the distance of the first tine's center of mass from said horizontal plane is substantially equal to a fourth product consisting of the second product times the distance of the second tine's center of mass from said horizontal plane.

2. A blade according to claim 1 comprising four tines, each tine angularly spaced at 90° to two adjacent tines.

3. A blade according to claim 2, wherein a first pair of opposing tines are bent upwardly along their length and a second pair of opposing tines are bent downwardly along their length.

4. A blade according to claim 2, wherein each of said tines is bent from horizontal along its length, and wherein each tine is bent at a different angle than each of the other tines.

5. A blade according to claim 1, wherein one of said tines is bent upwardly along its length at an angle greater than 45°.

6. A blade according to claim 1, wherein one of said tines is bent downwardly along its length at an angle greater than 45°.

7. A blade according to claim 1, wherein the first product is designed to be within 1% of the second product.

8. A blade according to claim 1, wherein the third product is designed to be within 1% of the fourth product.

9. A method of manufacturing a blade for use in a blender wherein said blade is to rotate about a vertical axis of rotation, comprising the steps:
   forming a central hub portion defining a central horizontal plane,
   forming a plurality of tines arranged in opposed pairs extending outwardly from said body portion asymmetrically relative to one another, each opposed pair having a first tine and a second tine, the first tine having a mass $M_1$ and having a center of mass a first distance $X_1$ from the axis of rotation and a second distance $X_2$ from the horizontal plane, the second tine having a mass $M_2$ and having a center of mass a third distance $X_3$ from the axis of rotation and a fourth distance $X_4$ from the horizontal plane,
   balancing each tine in said opposed pair to the other such that a first product consisting of $M_1 * X_1$ is substantially equal to a second product consisting of $M_2*X_3$ and further a third product consisting of $M_1*X_1*X_2$ is substantially equal to a fourth product consisting of $M_2*X_3*X_4$.

10. A method according to claim 9, wherein said step of balancing comprises forming each tine of said opposed pair such that the defined products for each tine in said opposed pair are designed to be within 1% of such defined products for the other tine in said opposed pair.

11. A method according to claim 9, wherein said step of forming a plurality of tines comprises forming four tines, each tine being angularly spaced at 90° to two adjacent tines.

12. A method according to claim 9, wherein said step of forming a plurality of tines comprises forming four tines, with two opposing tines being bent upwardly along their length and two other opposing tines being bent downwardly along their length.

13. A domestic blender comprising:
a rotatable blade,
a jar for receiving a material to be acted upon by said rotatable blade which is positioned within said jar,
a motor carried in a housing with a drive shaft for rotatingly driving said blade, said blade comprising a central hub portion defining a horizontal plane,
a plurality of tines extending outwardly from said hub portion asymmetrically relative to one another, said tines being arranged in opposed pairs wherein each opposed pair includes a first tine and a second tine and each tine having a mass and a center of mass, the first tine and second tine in an opposed pair being balanced with respect to each other,
wherein a first product consisting of the first tine's mass times a distance of the first tine's center of mass from said axis of rotation is substantially equal to a second product consisting of the second tine's mass times a distance of the second tine's center of mass from said axis of rotation
further wherein a third product consisting of the first product times the distance of the first tine's center of mass from said horizontal plane is substantially equal to a fourth product consisting of the second product times the distance of the second tine's center of mass from said horizontal plane.

14. A blade according to claim 13 comprising four tines, each tine angularly spaced at 90° to two adjacent tines.

15. A blade according to claim 14, wherein a first pair of opposing tines are bent upwardly along their length and a second pair of opposing tines are bent downwardly along their length.

16. A blade according to claim 14, wherein each of said tines is bent from horizontal along its length, and wherein each tine is bent at a different angle than each of the other tines.

17. A blade according to claim 13, wherein one of said tines is bent upwardly along its length at an angle greater than 45°.

18. A blade according to claim 13, wherein one of said tines is bent downwardly along its length at an angle greater than 45°.

19. A blade according to claim 13, wherein the first product is designed to be within 1% of the second product.

20. A blade according to claim 13, wherein the third product is within 1% of the fourth product.

21. A blade for use in a blender wherein said blade is to rotate about a vertical axis of rotation, said blade comprising:
a central hub portion defining a horizontal plane,
four tines extending outwardly from said hub portion asymmetrically relative to one another, each tine angularly spaced at 90° to two adjacent tines to form two opposed pairs,
a first pair of opposing tines being bent upwardly along their length with one of the tines being bent upwardly at an angle greater than 45° and a second pair of opposing tines being bent downwardly along their length with one of said tines being bent downwardly at an angle greater than 45°, each pair of opposing tines including a first tine and a second tine and each tine having a mass and a center of mass,
the first tine and second tine in an opposed pair being balanced with respect to each other, wherein a first product consisting of the first tine's mass times a distance of the first tine's center of mass from said axis of rotation is substantially equal to a second product consisting of the second tine's mass times a distance of the second tine's center of mass from said axis of rotation, and
further wherein a third product consisting of the first product times the distance of the first tine's center of mass from said horizontal plane is substantially equal to a fourth product consisting of the second product times the distance of the second tine's center of mass from said horizontal plane,
wherein, for each tine in an opposed pair, the design magnitude of the first product is within 1% of the second product.

* * * * *